(12) United States Patent
Zhang

(10) Patent No.: US 8,865,816 B2
(45) Date of Patent: Oct. 21, 2014

(54) FORMALDEHYDE-FREE BINDER COMPOSITIONS CONTAINING METAL-ION CROSSLINKERS AND PRODUCTS MADE THERE FROM

(75) Inventor: Mingfu Zhang, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 519 days.

(21) Appl. No.: 12/683,213

(22) Filed: Jan. 6, 2010

(65) Prior Publication Data

US 2011/0166275 A1  Jul. 7, 2011

(51) Int. Cl.
  *C08K 5/098* (2006.01)
  *C08K 3/22* (2006.01)
  *C08K 5/00* (2006.01)
  *C08K 5/053* (2006.01)
  *C08L 33/02* (2006.01)

(52) U.S. Cl.
  CPC ........... *C08K 5/098* (2013.01); *C08L 33/02* (2013.01); *C08K 3/22* (2013.01); *C08K 5/0025* (2013.01); *C08K 5/053* (2013.01)

USPC ............ 524/397; 524/399; 524/400; 524/432

(58) Field of Classification Search
  USPC ......................................................... 524/413
  See application file for complete search history.

(56) References Cited

U.S. PATENT DOCUMENTS

| | | | | |
|---|---|---|---|---|
| 4,272,294 A | * | 6/1981 | Jaunarajs | 524/5 |
| 5,895,804 A | * | 4/1999 | Lee et al. | 525/54.3 |
| 6,803,439 B2 | * | 10/2004 | Taylor | 526/329.5 |
| 7,067,579 B2 | * | 6/2006 | Taylor et al. | 524/503 |
| 2006/0084737 A1 | * | 4/2006 | Briner et al. | 524/387 |

* cited by examiner

*Primary Examiner* — Doris Lee
(74) *Attorney, Agent, or Firm* — Robert D. Touslee

(57) ABSTRACT

Formaldehyde-free binder compositions are described. The binder compositions may include a polycarboxy compound, and an organic crosslinking agent, and a polyvalent metal compound. The compositions may also optionally include a cure catalyst. In addition, composite materials are described. The composite materials may include a mat of fibers and a binder composition. The binder composition may include a polycarboxy compound, an organic crosslinking agent, and a polyvalent metal compound.

17 Claims, 2 Drawing Sheets

FORMALDEHYDE-FREE BINDER COMPOSITIONS CONTAINING METAL-ION CROSSLINKERS AND PRODUCTS MADE THERE FROM

CROSS-REFERENCES TO RELATED APPLICATIONS

Not Applicable

FIELD

Binder composition and described that may be used in composite materials, including fiber containing materials such as fiber-reinforced composites and fiberglass insulation. The formaldehyde-free binder compositions may include a water-soluble polycarboxy compound, an organic crosslinking agent, and a metal compound containing polyvalent metal. The binder compositions may further optionally include a cure catalyst that catalyzes crosslinking reactions between the polycarboxy compound and the organic crosslinking agent.

BACKGROUND

Binders for fibrous materials, such as fiberglass, have a variety of uses ranging from stiffening applications where the binder is applied to woven or non-woven fibrous sheet goods and is cured, producing a stiff product; thermoforming applications wherein the binder resin is applied to a sheet or lofty fibrous product, following which it is dried and optionally is B-staged to form an intermediate but yet curable product; and to fully cured systems such as building insulation.

Fiberglass insulation products generally comprise matted glass fibers bonded together by a cured thermoset binder. The rigid thermoset polymer matrix ensures that a finished fiberglass insulation product, when compressed significantly for packaging and shipping, recovers to its labeled thickness when installed in a building.

Due to the excellent cost/performance ratio, phenol-formaldehyde binders have been widely used in fiberglass insulation products. However, phenol-formaldehyde binders emit a substantial amount of formaldehyde during the curing process and finished products can off-gas formaldehyde after being installed. Because of the existing and proposed legislation on lowering or eliminating formaldehyde, extensive efforts have been directed to replace formaldehyde-based binders with formaldehyde-free binders.

One type of these formaldehyde-free binder compositions rely on esterification reactions between carboxylic acid groups in polycarboxy polymers and hydroxyl groups in alcohols. Water is the main byproduct of these covalently crosslinked polyesters, which makes these binders environmentally benign. However, reaction rates for these compositions are generally slower than for formaldehyde-containing systems, which can reduce production rates for materials incorporating these binders.

Additionally, the slower reaction rates and more polar reaction compounds in the formaldehyde-free binders can have deleterious effects on the final products made with these compositions. The slower reactions rates can result in less crosslinking in the final binder, which can reduce the mechanical strength of composite products that include the binder. The more polar reaction compounds are usually more hydrophilic, resulting in increased water absorption by the binder in the final product. When the final product is exposed to humid environments, the increased water absorption can significantly shorten the lifetime of the material. Thus, there is a need for new formaldehyde-free binder compositions that provide improved mechanical strength and/or water resistance (among other properties) to the final product. This and other issues are addressed in the present application.

BRIEF SUMMARY

Formaldehyde-free binder compositions are described that may include polyvalent metal ions used as crosslinking agents. The polyvalent metal ions may crosslink carboxyl groups in the polycarboxy compounds of the binder. They may also be used in combination with one or more organic crosslinking agents (e.g., polyols) to improve the degree of crosslinking in the cured binder. The polyvalent metal crosslinking agents may also be selected to produce a binder with increased hydrophobicity that enhances water resistance. Binder compositions that include these polyvalent metal ion crosslinking agents may be used in a variety of applications, including fibrous composites with improved mechanical strength and/or water resistance.

The polyvalent metal ions may be introduced into polycarboxylic acid-containing binder compositions as metal compounds. The metal compounds may include compounds that generate polyvalent metal ions when mixed with polycarboxylic acid-containing binder compositions. Examples of these compounds may include metal oxides, metal hydroxides, metal salts, and mixtures thereof, among other types of metal-containing compounds. Examples of the metals may include zinc, calcium, and aluminum, among other metals. The metal compound may be added directly to the binder composition.

Embodiments of the invention include formaldehyde-free binder compositions that include a polycarboxy compound, an organic crosslinking agent, and a polyvalent metal compound. The compositions may also optionally include a cure catalyst that catalyzes the crosslinking reaction between the polycarboxy compound and the organic crosslinking agent.

Embodiments of the invention may also include composite materials that include a mat of fibers and a binder composition. The binder composition may include a polycarboxy compound, an organic crosslinking agent, a polyvalent metal compound, and optionally a cure catalyst.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF EMBODIMENTS

Figure 1:
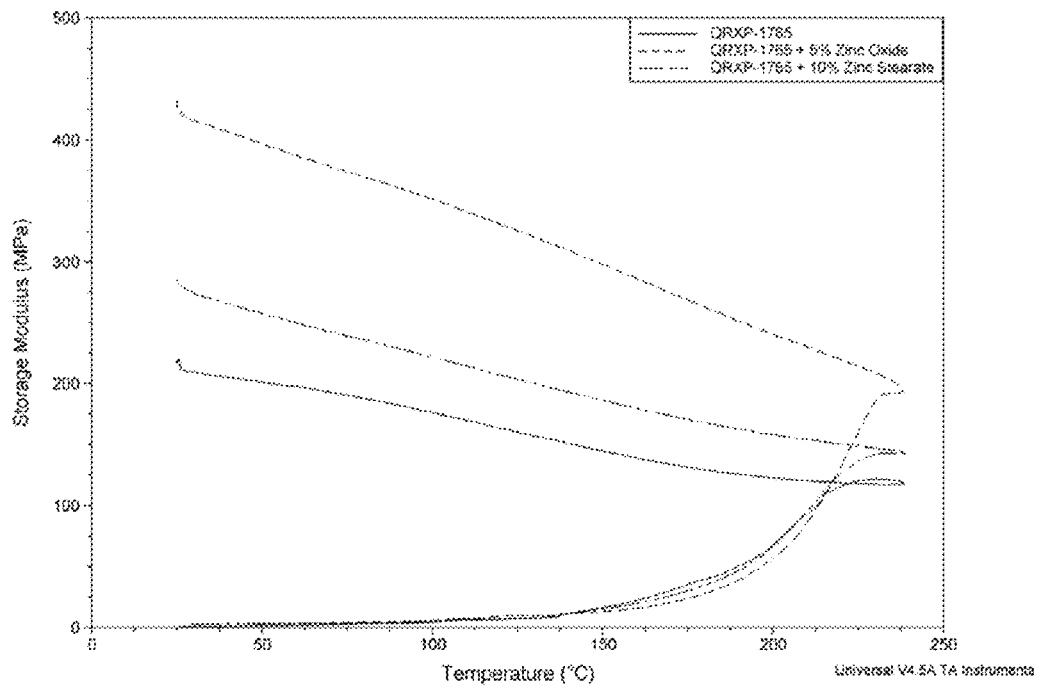
FIG. 1 shows the dynamic mechanical analysis of a polycarboxylic acid-containing binder, QRXP-1765 from Rohm & Haas, with and without zinc(II) compounds.

Binder compositions are described that include one or more polyvalent metal compounds that act as a crosslinking agent. These formaldehyde-free binder compositions have been found to have increased mechanical strength and/or improved water resistance compared to similar binders without the polyvalent metal. While not wishing to be bound to a particular theory, it is believed that the polyvalent metal ions in these crosslinking agents react with crosslinkable groups of other binder components (e.g., carboxyl groups of the polycarboxy compounds), forming crosslinking bonds in the cured binder. This metal-ion crosslinking may include the formation of coordination complex between polyvalent metal ion and the crosslinkable polymer and/or the formation of metal-polymer salts.

The polyvalent metal crosslinking agents form part of the crosslinking bonds in the cured binder. This distinguishes these agents from metal-containing catalysts that facilitate the formation of the crosslinking bonds without being consumed by the formation of the bonds. In many instances, this means that more crosslinking agent is added to the binder composition than would be typical if the metal-containing compound were just acting as a catalyst that could facilitate the formation of multiple crosslinking bonds without being consumed.

In many polycarboxylic-acid-containing binder compositions there are excess crosslinkable groups that may not otherwise form crosslinking bonds with an organic crosslinking agent due to kinetic reasons and/or steric hindrance. Thus, the addition of the polyvalent metal crosslinking agent may improve the degree of crosslinking in the binder beyond what could be achieved by using an organic crosslinking agent alone. In some instances, the metal-ion crosslinking may form bonds that are as strong as or stronger than covalent bonds formed between the polycarboxy compound and the organic crosslinking agent. The larger number of crosslinking bonds may increase the mechanical strength of the binder. The increased strength makes these binder compositions well suited for composite materials such as fibrous mats. Mats made with the binder can have better mechanical strength than mats made with conventional, formaldehyde-free binders.

The present binder compositions may include a combination of one or more polycarboxy compounds, organic crosslinking agents, and polyvalent metal compounds. The compositions may also optionally include a cure catalyst. Additional details about components of the binder compositions are now described.

Exemplary Metal-Containing Crosslinking Agents

Polyvalent metal ions in the binder compositions may include polyvalent transition metal ions, polyvalent alkaline earth metal ions, and polyvalent metal ions in Group 13 & 14 of the periodic table, among other polyvalent metal ions. The polyvalent metal ions are capable of crosslinking carboxyl groups of polycarboxy compounds. The use of some polyvalent metal ions should be carefully considered in view of toxicity and ascetic issues. For example, certain polyvalent metals such as arsenic, mercury, lead, and cadmium are known to be toxic. Other polyvalent metal ions, such as ions of copper, iron, cobalt, and nickel are known to have strong absorption peaks in the visible portion of the electromagnetic spectrum and may therefore produce color in cured binder. These polyvalent metals may still be used in applications where they are compatible with the toxicity and/or color requirements of the final material. In the applications where the binder should be colorless, ion of polyvalent metals such as zinc, calcium, aluminum, tin, and zirconium, among other polyvalent metals, may be used. For example, binder compositions for fiber composite materials may include polyvalent metal ions such as zinc, calcium, and aluminum ions, among other kinds of polyvalent metal ions.

The polyvalent metal ions may be part of a polyvalent metal crosslinking agent that is added to the other components of the binder composition. These polyvalent metal crosslinking agents may include metal oxides, metal hydroxides, and metal salts, among other polyvalent metal compounds. The metal salts may include metal stearates that are the metal salts of hydrophobic fatty acids. In some instances, metal stearate crosslinking agents can impart increased mechanical strength and increased water resistance in the binder and final product. Combinations of two or more different polyvalent metal compounds may also be added to the binder composition. The polyvalent metal crosslinking agent may be fully dissolved in an aqueous binder solution containing the polycarboxy compound. For example, a zinc(II)-containing crosslinking agent such as zinc carbonate, zinc citrate, and/or zinc oxide may be dissolved in an aqueous polycarboxylic-acid-containing binder solution. Alternatively, the polyvalent metal crosslinking agent may be partially dissolved in the binder solution. For example, zinc oxide particles may be partially dissolved in polycarboxylic acid-based binder solution that is subsequently used to make a fibrous product. The dissolved zinc ions crosslink polycarboxy polymer chains, while the un-dissolved zinc oxide particles embedded in the polymer matrix may function as reactive fillers. Combinations of polyvalent metal crosslinking agents, such as metal oxides and metal stearates, can also be dispersed in a binder composition.

The amount of the fully or partially dissolved polyvalent metal crosslinking agent in the binder composition may be about 1% or more of the molar equivalent of the excess carboxyl groups in the polycarboxy compound of the binder. This molar equivalent of the excess carboxyl groups may be determined by subtracting the total number of crosslinking groups (e.g., hydroxyl groups) in the organic crosslinking agent from the total number of carboxyl groups in the polycarboxy compound. Examples of the present binder compositions may have an amount of the polyvalent metal crosslinking agent ranging from about 1% to about 50% of the molar equivalent of the excess carboxyl groups in the polycarboxy compound of the binder.

One specific example of a polyvalent metal ion used in the binder composition, is the use of zinc(II) in a solution of a polycarboxylic acid and a polyol (the organic crosslinking agent). The amount of zinc(II) is 1% to 50%, preferably 1% to 40%, and most preferably 1% to 25%, by molar of the excess amount of carboxyls in polycarboxylic acid as determined from the total molar amount of carboxyls in polycarboxylic acid minus the total molar amount of hydroxyls in polyol.

Exemplary Polycarboxy Compounds

The polycarboxy compound in the binder composition may include one or more polycarboxylic acids such as polymeric polycarboxylic acid, monomeric polycarboxylic acid, and mixtures thereof. The polycarboxylic acid may have two or more carboxyl groups.

The polycarboxy compound may also include polymeric polycarboxylic acids that are homopolymers or copolymers of any of acrylic acid, methacrylic acid, maleic acid, fumaric acid, crotonic acid, acid anhydrides, and mixtures thereof. Representative polymeric polycarboxylic acids include, but not limited to, polyacrylic acid, polymethacrylic acid, polycrotonic acid, polyfumaric acid, polymaleic acid, poly-2-methyl maleic acid, polyitaconic acid, poly-2-methyl itaconic acid, poly-alpha-beta-methylene glutaric acid, polystyrene maleic acid, polystyrene-co-acrylic acid, polyethylene-co-acrylic acid, polyethylene-co-maleic acid, polybutadiene-co-maleic acid, etc., and copolymers of the foregoing.

The molecular weights of the polymeric polycarboxy compounds (e.g., polycarboxylic acid polymers) may range from about 1,000 g/mol to 1,000,000, g/mol. Examples of the molecular weight ranges may include about 1,000 to about 10,000 g/mol, and about 1,000 g/mol to about 5,000 g/mol, among other molecular weight ranges.

Monomeric polycarboxylic acids may include dicarboxylic acids, tricarboxylic acids, tetracarboxylic acids, pentacarboxylic acids, etc. They may also include the equivalent acid anhydrides, as well as combinations of acids and acid anhydrides. The monomeric polycarboxylic acids may be optionally substituted with hydroxy, alkoxy, alkyl, and/or halogen groups, among other functional groups.

Exemplary Organic Crosslinking Agents & Cure Catalysts

The organic crosslinking agent in the binder compositions may include polyols containing at least two hydroxyl groups. The polyols may include without limitation, monomeric diols (e.g., ethylene glycol; 1,3-propanediol; 1,4-butanediol; and 1,6-hexanediol, etc.); monomeric triols (e.g., glycerol, trimethylolethane, and trimethylolpropane, etc.); erythritols (e.g., pentaerythritol, etc.), sorbitol, and/or alcohol amines (e.g., trimethanolamine, triethanolamine, tripropanolamine, etc.), among other polyols.

Optionally, the binder compositions may also include a cure catalyst. Examples of cure catalysts may include without limitation phosphorous-containing catalysts, boron-containing catalysts, and Lewis acids. For example, the cure catalyst may be an alkali metal salt of a phosphorus-containing acid.

EXPERIMENTAL

The present binder compositions show improved mechanical strength as compared to the corresponding binder compositions without a polyvalent metal-ion crosslinker. FIG. 1 shows a dynamic mechanical analysis (DMA) of three binder compositions: (1) QRXP-1765 binder from Rohm & Haas, (2) QRXP-1765 with 5% zinc oxide, and (3) QRXP-1765 resin with 10% zinc stearate. In the zinc oxide composition, the zinc oxide was fully dissolved in the QRXP-1765 binder before the binder was cured. It is clear that the addition of zinc(II) compounds (zinc oxide or zinc stearate) improves the modulus of cured binder significantly. While in this specific example the crosslinking primarily takes place via an esterification reaction between carboxyls of polycarboxylic acid and hydroxyls of polyol, additional crosslinking provided by the bonding between carboxyls of polycarboxylic acid and zinc(II) ions adds in the strength of cured binder.

Different from the covalent crosslinking reactions in thermoset binders, which generally require significant amount of thermal energy to form covalent bonds, metal ion crosslinking occurs without extensive heating. This can impart increased mechanical strength to fibrous products when the available thermal energy is insufficient to form adequate covalent crosslinking.

Figure 2:
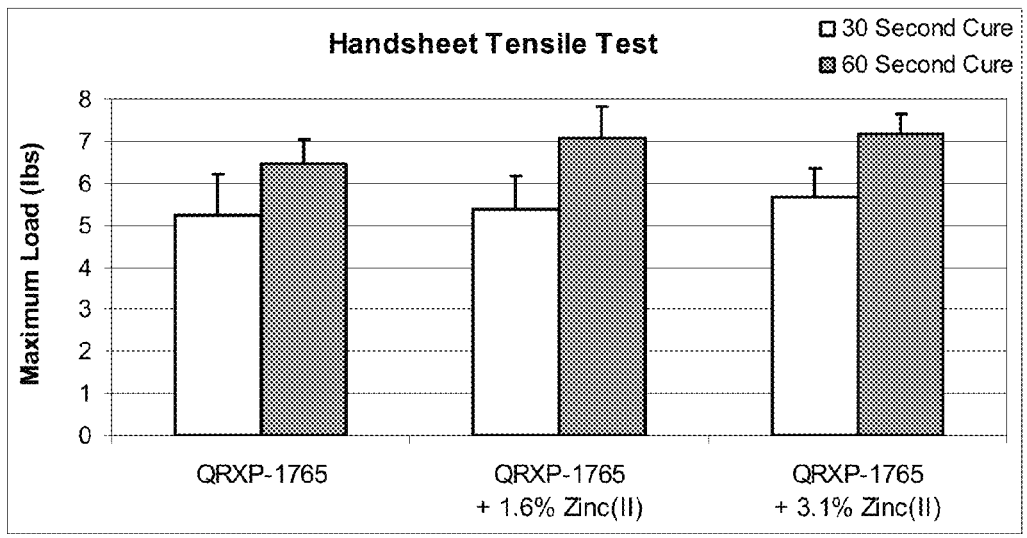
FIG. 2 shows the impact of zinc(II) ion on the tensile strength of QRXP-1765 binder.

The hybrid polycarboxylic acid-containing thermoset binders of the present invention, in which the crosslinking is achieved via a combination of covalent bonding and metal ion bonding, can have superior mechanical strength. FIG. 2 shows the impact of zinc(II) ion on the tensile strength of QRXP-1765 binder. In this experiment, zinc(II) was introduced to the binder composition by adding zinc citrate. As shown in FIG. 2, adding zinc(II) into the binder increases the tensile strength of the fiberglass filter paper coated with cured binders.

Some of the polycarboxylic acid-based thermoset binders aforementioned have been found to be more hydrophilic than phenol-formaldehyde binders. The hydrophilicity of cured binder makes fibrous products more prone to moisture sorption, thereby possibly compromising the integrity of products. Improving moisture resistance of polycarboxylic acid-containing binders can help to improve the performance of fibrous products under humid environments. The present binder compositions include compositions that may be used to make binders with increased water resistance that are better able to withstand humid environmental conditions.

These binder compositions may include polyvalent metal salts of fatty acids that make the binders having an increased degree of crosslinking and improved water resistance. While not wishing to be bound by any particular theory, the hydrophobic fatty acid in the hybrid binder is believed to better repel water and improve the integrity of the bonding under humid environments.

Figure 3:
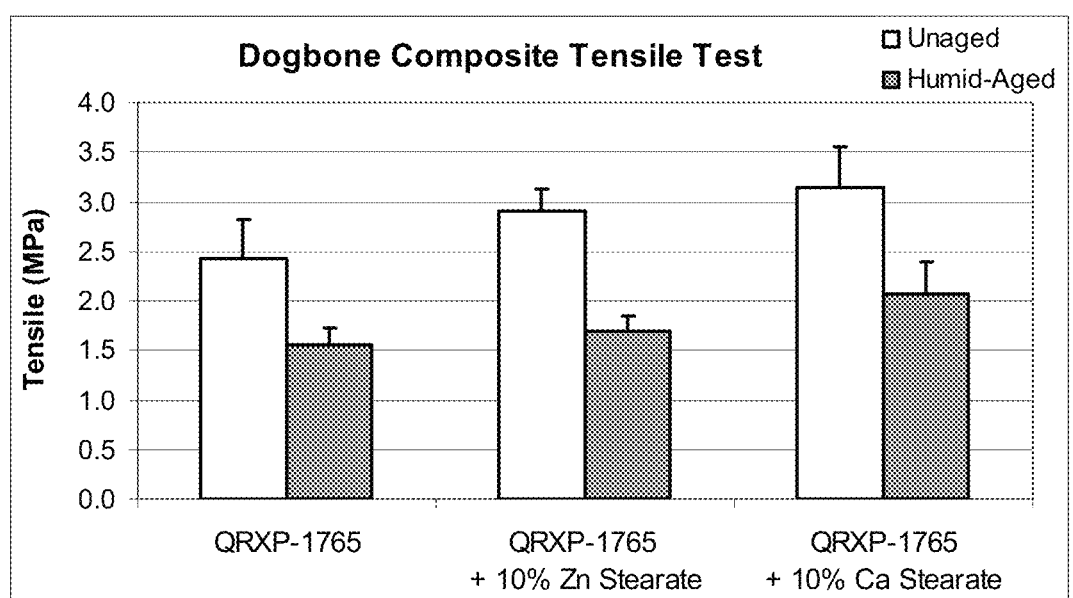
FIG. 3 shows the results of dogbone composite tensile tests for the binder compositions with zinc stearate or calcium stearate.

FIG. 3 shows the results of dogbone composite tensile tests of QRXP-1765 binder with zinc stearate or calcium stearate. Substantial increase in tensile strength was obtained when zinc stearate or calcium stearate was used to replace 10% of QRXP-1765 binder. The tensile strengths before and after humid aging were improved by adding metal stearates. It is believed that the polyvalent metal stearates improve water resistance of cured binder. Thus in some instances the polyvalent metal stearates may perform a dual function when used with polycarboxylic acid-containing thermoset binders.

The polyvalent metal compound, e.g., fatty acid salts of metals, can be mixed in with polycarboxylic acid-containing binder compositions to form the final binder composition to be applied to the fibrous materials.

More particularly, in the preparation of fiberglass insulation products, molten streams of glass are drawn into fibers of random lengths and blown into a forming chamber where they are randomly deposited as a mat onto a traveling conveyor. The glass fibers, while in transit in the forming chamber, are sprayed with the aqueous binder composition of the present invention. The mat is then conveyed to and through a curing oven wherein heated air is passed through the mat to cure the resin. The mat is slightly compressed to give the finished product a predetermined thickness and surface finish. Typically, the curing oven is operated at a temperature from about 150° C. to about 325° C. Preferably, the temperature ranges from about 180° C. to about 225° C. Generally, the mat resides within the oven for a period of time from about ½ minute to about 3 minutes. The fibrous glass having a cured, rigid binder matrix emerges from the oven in the form of a bat which may be compressed for packaging and shipping and which will thereafter substantially recover its vertical dimension when unconstrained.

The formaldehyde-free hybrid binder composition may also be applied to an already formed nonwoven by conventional techniques such as, for example, air or airless spraying, padding, saturating, roll coating, curtain coating, beater deposition, coagulation, or the like. The formaldehyde-free binder composition of the present invention, after it is applied to a nonwoven, is heated to effect drying and curing. The duration and temperature of heating may affect the rate of drying, processability and handleability, and property development of the treated substrate. Heat treatment at about 120° C., to about 400° C., for a period of time between about 3 seconds to about 15 minutes may be carried out (e.g., treatment at about 150° C. to about 250° C.). The drying and curing may be effected in two or more distinct steps in some instances. For example, the composition may be first heated at a temperature and for a time sufficient to substantially dry but not to substantially cure the composition and then heated for a second time at a higher temperature and/or for a longer period of time to effect curing. Such a procedure, referred to as "B-staging", may be used to provide binder-treated nonwoven, for example, in roll form, which may at a later stage be cured, with or without forming or molding into a particular configuration, concurrent with the curing process.

The heat-resistant nonwovens may be used for applications such as, for example, insulation batts or rolls, as reinforcing mat for roofing or flooring applications, as microglass-based substrate for printed circuit boards or battery separators, as filter stock, as tape stock, as tape board for office petitions, in duct liners or duct board, and as reinforcement scrim in cementitious and non-cementitious coatings for masonry.

The following examples are provided to further illustrate the present invention, and are not meant to be limiting.

Example 1

Dynamic Mechanical Analysis

Solutions of three binder compositions—QRXP-1765, a polycarboxylic acid-based thermoset binder from Rohm & Haas, QRXP-1765 with 5% zinc oxide, and QRXP-1765 with 10% zinc stearate, were prepared. Specifically, for the binder composition of QRXP-1765 with zinc oxide, 5% zinc oxide (Aldrich) was dissolved in QRXP-1765 binder solution. For the binder composition of QRXP-1765 with zinc stearate, 10% zinc stearate (Aldrich) was dispersed in QRXP-1765 binder solution with 0.5% Spectrum 2650 surfactant from Petrolite Corp. (St. Louis, Mich.). pH of the three binder solutions were adjusted to 2.8 using sulfuric acid. The binder solutions were then coated onto fiberglass filter paper (Whatman), and the samples were subject to dynamic mechanical analysis. FIG. 1 shows the DMA scans of three binder compositions.

Example 2

Handsheet Tensile Test

Two levels of zinc citrate were added to Rohm & Haas QRXP-1765 binder, to achieve the zinc(II) level of 1.6% and 3.1% of total binder solids respectively. Binder solutions were adjusted to pH 2.8 with sulfuric acid and then coated onto fiberglass filter papers to achieve the binder content of 9.0±0.5%. The coated sheets were dried and then cured in a Mathis oven at 204° C. for 30 seconds and 60 seconds respectively. The fiberglass handsheets coated with cured binder were cut into 1"×4" pieces for tensile testing. Maximum load, which is the highest load produced before the sample breaks, was recorded. FIG. 2 shows the maximum load results of the binders cured for 30 seconds and 60 seconds respectively.

Example 3

Dogbone Composite Tensile Test

Three binder compositions—QRXP-1765 binder, QRXP-1765 with 10% zinc stearate, and QRXP-1765 with 10% calcium stearate, were prepared. Specifically, zinc stearate (LOAD Disperso II) from Norac (Azusa, Calif.) and calcium stearate (Calsan 50) from BASF (Ludwigshafen, Germany) were used to replace 10% of QRXP-1765 binder in the binder compositions. pH of the three binder solutions were adjusted to 2.8 using sulfuric acid. A silane coupling agent was added to each binder composition at 1.0% by weight of the total binder solids.

The binder solutions were mixed with glass beads, and then pressed in molds of dogbone shape to form test samples. The binder content is 2.4%. The molded samples were then dried and cured in an oven at 204° C. for 20 minutes. Tensile tests were conducted on the dogbone samples before and after humid aging. The aging process involved exposing dogbone samples containing the cured binder to air at a temperature of 120° F., with 95% relative humidity for 24 hours. FIG. 3 shows the tensile strength results of the three binder compositions before and after humid aging.

Example 4

Production Trial

In light of the success of lab trials, a production trial to examine certain embodiments of the present invention was conducted in a fiberglass insulation manufacturing facility using Rohm & Haas QRXP-1765 binder with and without zinc oxide. Specifically, zinc oxide (Horsehead, Monaca, Pa.) was used to replace 3-5% QRXP-1765 binder in the binder composition. Zinc oxide was fully dissolved in QRXP-1765 binder before the binder was applied.

The binder compositions, together with a silane, a dust suppressing agent, and additional water, were then sprayed onto glass fibers as they were being collected on the moving conveyor and cured to produce a finished R-19 insulation batt. The recovery and rigidity of trial products of each binder composition were then tested at the end of production line and after two weeks under ambient conditions. The rigidity was measured as the droop of insulation batt over a span of 36". Based on this testing protocol, the lower the droop value, the better is the rigidity of products. The recovery and rigidity results are listed in Table 1 below. While there is essentially no change in recovery, the product rigidity was improved by adding relatively small amount (3-5%) of zinc oxide, as indicated by the lower droop values.

TABLE 1

Production trial of QRXP-1765 binder with various levels of zinc oxide.

| | | Binder | | |
|---|---|---|---|---|
| | | QRXP-1765 | QRXP-1765 with 3% ZnO | QRXP-1765 with 5% ZnO |
| Recovery (inches) | End of Line | 7.69 | 7.57 | 7.73 |
| | 2 weeks @ Ambient | 6.58 | 6.56 | 6.66 |
| Droop (inches) | End of Line | 0.98 | 0.97 | 0.82 |
| | 2 weeks @ Ambient | 1.73 | 1.65 | 1.57 |

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the acid" includes reference to one or more acids and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A formaldehyde-free binder composition, comprising:
    an aqueous solution of a not yet cured polycarboxy compound, wherein the not yet cured polycarboxy compound is a polymeric polycarboxylic acid;
    an organic crosslinking agent; and
    a polyvalent metal compound dissolved or dispersed in the aqueous solution of the polycarboxy compound, wherein the polyvalent metal compound is about 1% or more of the molar equivalent of excess carboxyl groups in the polycarboxy compound of the binder.

2. The binder composition of claim 1, wherein the polyvalent metal compound comprises a metal selected from the group consisting of zinc, calcium, aluminum, tin, and zirconium.

3. The binder composition of claim 1, wherein the polycarboxy compound comprises at least two carboxyl groups.

4. The binder composition of claim 1, wherein the polymeric polycarboxylic acid comprises a homopolymer or a copolymer of one or more acids selected from the group consisting of acrylic acid, methacrylic acid, maleic acid, fumaric acid, and crotonic acid.

5. The binder composition of claim 1, wherein the polymeric polycarboxylic acid has a molecular weight of about 1,000 g/mol to about 1,000,000 g/mol.

6. The binder composition of claim 1, wherein the polymeric polycarboxylic acid has a molecular weight of about 1,000 g/mol to about 5,000 g/mol.

7. The binder composition of claim 1, wherein the organic crosslinking agent comprises a nitrogen-containing compound.

8. The binder composition of claim 1, wherein the organic crosslinking agent comprises a polyol that includes at least two hydroxyl groups.

9. The binder composition of claim 8, wherein the polyol comprises a monomeric diol, a monomeric triol, an erythritol, a sorbitol, or an alcohol amine.

10. The binder composition of claim 1, wherein the polyvalent metal compound comprises a compound selected from the group consisting of an oxide, a hydroxide, and a salt.

11. The binder composition of claim 10, wherein the polyvalent metal compound comprises a salt of a fatty acid.

12. The binder composition of claim 11, wherein the fatty acid comprises a saturated fatty acid or an unsaturated fatty acid.

13. The binder composition of claim 1, wherein the binder composition further comprises a cure catalyst to catalyze a crosslinking reaction between the polycarboxy compound and the organic crosslinking agent.

14. The binder composition of claim 13, wherein the cure catalyst comprises a catalyst selected from the group consisting of a phosphorous-containing catalyst, boron-containing catalyst, and a Lewis acid catalyst.

15. The binder composition of claim 14, wherein the phosphorous-containing catalyst comprises an alkali metal salt of a phosphorus-containing acid.

16. The binder composition of claim 15, wherein the phosphorous-containing catalyst comprises sodium hypophosphite.

17. A formaldehyde-free binder composition, comprising:
    an aqueous solution of a not yet cured polycarboxy compound, wherein the not yet cured polycarboxy compound is a polymeric polycarboxylic acid anhydride;
    an organic crosslinking agent; and
    a polyvalent metal compound dissolved or dispersed in the aqueous solution of the polycarboxy compound, wherein the polyvalent metal compound is about 1% or more of the molar equivalent of excess carboxyl groups in the polycarboxy compound of the binder.

* * * * *